(12) United States Patent
Nagamine

(10) Patent No.: US 9,471,000 B2
(45) Date of Patent: Oct. 18, 2016

(54) EXPOSURE DEVICE AND IMAGE FORMATION APPARATUS HAVING THERMALLY-CONDUCTIVE SEALANT

(71) Applicant: Oki Data Corporation, Tokyo (JP)

(72) Inventor: Masamitsu Nagamine, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/724,996

(22) Filed: May 29, 2015

(65) Prior Publication Data
US 2015/0346629 A1 Dec. 3, 2015

(30) Foreign Application Priority Data
May 30, 2014 (JP) .................. 2014-112869

(51) Int. Cl.
G03G 15/04 (2006.01)
G02B 7/02 (2006.01)
G02B 3/06 (2006.01)
G02B 27/62 (2006.01)
G02B 19/00 (2006.01)

(52) U.S. Cl.
CPC ............ G03G 15/0409 (2013.01); G02B 3/06 (2013.01); G02B 7/025 (2013.01); G02B 27/62 (2013.01); G02B 19/0066 (2013.01); Y10T 29/49828 (2015.01)

(58) Field of Classification Search
CPC .. G03G 15/409; F21Y 2103/003; B41J 2/45; H05K 3/281; G02B 3/06; G02B 7/025; G02B 27/62; G02B 19/0066; Y10T 29/49828

USPC ............................................................ 399/4
See application file for complete search history.

(56) References Cited

U.S. PATENT DOCUMENTS 6,008,982 A * 12/1999 Smith ................. B60R 16/0238
174/538
2012/0075403 A1* 3/2012 Nagamine .................. B41J 2/45
347/242
2012/0140315 A1* 6/2012 Song ....................... G02F 1/167
359/296
2013/0051889 A1* 2/2013 Kimura ................. G06F 3/0338
400/490

FOREIGN PATENT DOCUMENTS

JP EP 1085788 A2 * 3/2001 ............. H05K 1/141
JP 2012-066499 A 4/2012

* cited by examiner

*Primary Examiner* — David Gray
*Assistant Examiner* — Trevor J Bervik
(74) *Attorney, Agent, or Firm* — Mots Law, PLLC

(57) ABSTRACT

An exposure device includes: a substrate having a first and second surface opposed to each other, wherein a light-emitting element array is mounted on the first surface; a protective sheet covering the second surface while exposing a part of the second surface in the vicinity of an edge of the substrate to define an exposed part of the second surface; a holder that supports a condenser lens array and that supports the substrate, with a gap formed between the holder and the exposed part of the substrate, to position the substrate such that light emitted from the light-emitting element array is condensed on a predetermined irradiation location through the condenser lens array; and a thermally-conductive sealant that covers the exposed part of the second surface of the substrate and seals the gap.

10 Claims, 7 Drawing Sheets

EXPOSURE DEVICE AND IMAGE FORMATION APPARATUS HAVING THERMALLY-CONDUCTIVE SEALANT

CROSS REFERENCE TO RELATED APPLICATIONS

This application claims priority based on 35 USC 119 from prior Japanese Patent Application No. 2014-112869 filed on May 30, 2014, entitled "EXPOSURE DEVICE AND IMAGE FORMATION APPARATUS", the entire contents of which are incorporated herein by reference.

BACKGROUND OF THE INVENTION

1. Field of the Invention

This disclosure relates to an exposure device and an image formation apparatus, and is suitable for application to electrophotographic printers (hereinafter also referred to as printers), for example.

2. Description of Related Art

In widespread printers as conventional printers, an electrostatic latent image is formed on the surface of a photoconductive drum by irradiating the drum's surface with light from an exposure device such as an LED head, which includes light-emitting elements such as light emitting diodes (LEDs) and a lens array, and then is developed to a toner image with application of toner to the electrostatic latent image.

Some of such exposure devices include, for example, a substrate with one of its surfaces equipped with an LED array chip having LEDs arranged linearly, a rod lens array configured to condense light emitted from an LED array chip, and a holder holding the substrate and the rod lens array such that the LED array chip on the substrate and the rod lens array face each other. In addition, in some exposure devices, an attachment is attached to the substrate so as to cover the other surface opposed to the one surface, and the substrate is fixed to the holder by bonding the holder and the attachment (see Patent Literature 1, for example).

In such an exposure device, the LED array chip mounted on the substrate emits light in an irradiation pattern based on an image to be printed. The emitted light is converged through the rod lens array, and the surface of a photoconductive drum disposed at a focus position of the rod lens array is exposed to the light, so that an electrostatic latent image is formed on the surface.

[Patent Literature 1] Japanese Patent Application Publication No. 2012-66499 (FIG. 5)

SUMMARY OF THE INVENTION

In the manufacturing of such an exposure device, the substrate is fixed to the holder with an adhesive after the holder is positioned with the optical axis of the LED array chip aligned with the center of the rod lens array. For this reason, in the exposure device, the substrate needs to be formed slightly smaller than the holder in order to form a gap between them, and this gap remains after the bonding with the adhesive. In the exposure device, however, problems such as a reduction in the amount of light may arise if foreign matter such as toner enters a space at the one surface side of the substrate, namely, a space around the LED array chip and the rod lens array. To prevent this, the gap between the substrate and the holder is sealed with a sealant such as silicone.

Meanwhile, in some exposure devices, a protective sheet covering the entire other surface of the substrate is placed between the other surface of the substrate and the attachment. The protective sheet can prevent a circuit on the substrate from being physically damaged by the attachment and, particularly when the attachment is conductive like metal, can prevent a short circuiting of the circuit on the substrate if the sheet is insulative. In addition, by covering the entire other surface of the substrate with the protective sheet, the sheet can prevent foreign matter such as toner from entering the one surface side of the substrate via through-holes formed in the substrate.

On the other hand, due to its nature, the LED array chip of such an exposure device generates heat at the time of emitting light and transmits the heat to the substrate. However, since the substrate is not in contact with a thermally conductive component such as the holder and the other surface of the substrate is wholly covered with the protective sheet, the exposure device cannot release the generated heat to any other part efficiently. For this reason, the exposure device has a problem in that the LED array chip is heated to such an extremely high temperature as to degrade the performance of the chip, or even break the chip in some cases.

An embodiment of the invention aims to propose an exposure device and an image formation apparatus capable of securing a substrate position adjustment function and improving heat dissipation performance at the same time.

An aspect of the invention is an exposure device that includes: a substrate having a first and second surface opposed to each other, wherein a light-emitting element array is mounted on the first surface; a protective sheet covering the second surface while exposing a part of the second surface in the vicinity of an edge of the substrate to define an exposed part of the second surface; a holder that supports a condenser lens array and that supports the substrate, with a gap formed between the holder and the exposed part of the substrate, to position the substrate such that light emitted from the light-emitting element array is condensed on a predetermined irradiation location through the condenser lens array; and a thermally-conductive sealant that covers the exposed part of the second surface of the substrate and seals the gap.

According to the above aspect of the invention, the substrate can be positioned with respect to the holder so that the light emitted from the light-emitting element array attached to the substrate may be condensed appropriately through the condenser lens array. Further, thanks to the sealant that seals the gap between the substrate and the holder, it is possible to improve thermal conductivity between the holder and the exposed part defined in the second surface of the substrate.

Thus, the substrate can be positioned with respect to the holder while the position of the light-emitting element array is adjusted with respect to the condenser lens array. Further, thanks to the sealant that seals the gap between the substrate and the holder, it is possible to improve thermal conductivity between the holder and the exposed part defined in the second surface of the substrate. Thereby, this aspect of the invention can secure a substrate position adjustment function and improve heat dissipation performance at the same time.

DETAILED DESCRIPTION OF EMBODIMENTS

Figure 1:
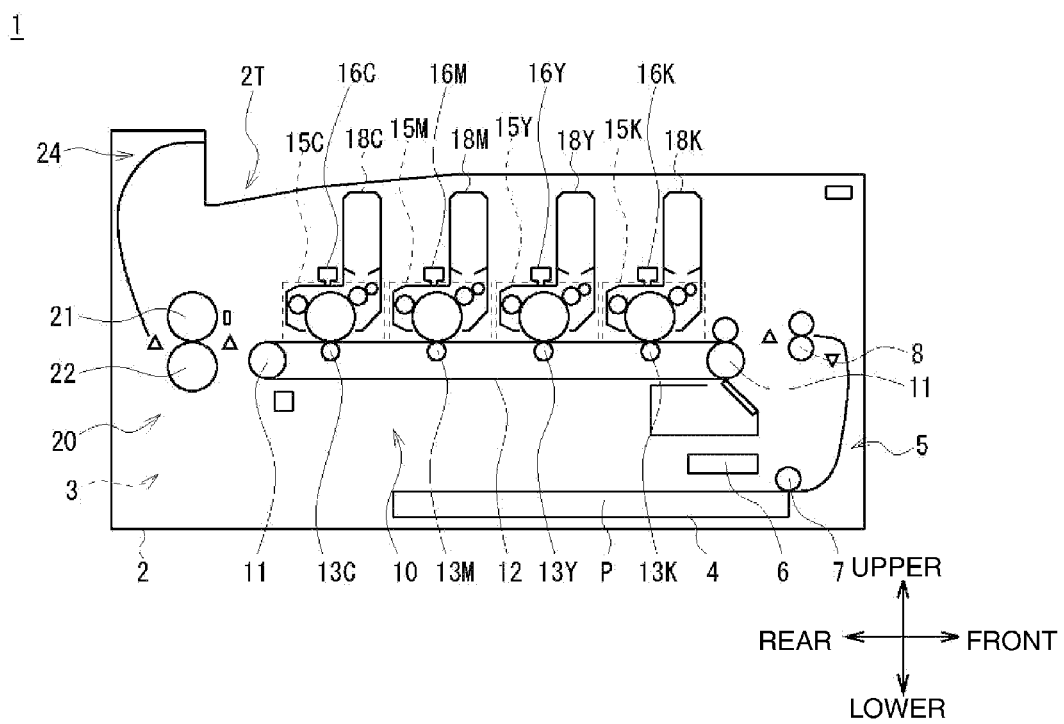
FIG. 1 is a schematic view illustrating the configuration of a color printer.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

[1. Configuration of Color Printer]

As illustrated in a left side view of FIG. 1, color printer 1 is a color electrophotographic printer, and is configured to print a desired color image on paper sheet P of A3 size or A4 size, for example.

Color printer 1 which is an image formation apparatus has various components arranged inside a substantially box-shaped printer chassis 2. Incidentally, in the following description, a right-edge part in FIG. 1 is the front face of color printer 1, and an upward/downward direction, a leftward/rightward direction, and a forward/rearward direction are used and are defined as color printer 1 is viewed while facing the front face of the printer.

Controller 3 has overall control of color printer 1. Controller 3 is connected to a host apparatus (not illustrated) such as a personal computer by wire or wirelessly via a communication processor (not illustrated). Upon receiving a command to print a color image to be printed together with an image data of the color image from the host apparatus, controller 3 executes printing processing to form a print image on a surface of paper sheet P.

Sheet housing cassette 4, sheet feeder 5, and sheet-color measurement unit 6 are arranged inside printer chassis 2 in its lowermost part. Sheet housing cassette 4 is configured to house paper sheets P. Sheet feeder 5 is configured to pick up and feed one at a time paper sheets P stacked in sheet housing cassette 4. Sheet-color measurement unit 6 is configured to measure the color of paper sheet P thus fed. Sheet feeder 5 is located at a front upper side of sheet housing cassette 4, and includes rollers such as hopping roller 7 and paired register rollers 8, a guide for guiding paper sheet P, and the like. Hopping roller 7 is disposed at the front upper side of sheet housing cassette 4 and has a central axis extending in the leftward/rightward direction, and paired register rollers 8 are disposed above hopping roller 7.

Under the control of controller 3, sheet feeder 5 rotates hopping roller 7, paired register rollers 8, and the like to pick up and take in one at a time paper sheets P housed in sheet housing cassette 4, advance the sheet to a front upper part of the printer, and then flip it over toward the rear at a position substantially in the center in the upward/downward direction of printer chassis 2 and near the front edge thereof. Sheet-color measurement unit 6 measures the color of paper sheet P and sends the measurement result to controller 3.

Transfer belt unit 10 is disposed inside printer chassis 2 above sheet housing cassette 4 in such a way as to traverse the inside of the entire printer chassis 2 in the forward/rearward direction. Transfer belt unit 10 includes: front and rear rollers 11 each having the shape of a slender cylinder and having a central axis extending in the leftward/rightward direction; and transfer belt 12 stretched around front and rear rollers 11. Transfer belt 12 is in the form of an endless belt which is wide in the leftward/rightward direction, and travels along with the rotation of rollers 11. Under control of controller 3, transfer belt unit 10 rotates rollers 11 and thereby drives transfer belt 12 to transport paper sheet P transferred from sheet feeder 5 rearward on the upper surface of transfer belt 12.

Meanwhile, above transfer belt unit 10, i.e., in a part of printer chassis 2 higher than the center thereof, four image drum units 15C, 15M, 15Y, and 15K (hereinafter, these are referred to as image drum units 15 collectively) are arranged in that order from the rear side toward the front side. In other words, image drum units 15 of the respective colors are disposed in a so-called tandem arrangement.

Incidentally, image drum units 15C, 15M, 15Y, and 15K respectively correspond to the colors of cyan (C), magenta (M), yellow (Y), and black (K). In addition, image drum units 15C, 15M, 15Y, and 15K have the same configuration except for the colors of toner corresponding thereto. Image drum units 15 which are image formation units each have substantially the shape of a box relatively long in the leftward/rightward direction so as to suit to the horizontal width of paper sheet P.

Further, in printer chassis 2, Light Emitting Diode (LED) heads 16C, 16M, 16Y, and 16K (hereinafter, these are referred to as LED heads 16 collectively) which are exposure devices are arranged to correspond to image drum units 15C, 15M, 15Y, and 15K respectively. LED heads 16 each have the shape of a rectangular solid long in the leftward/rightward direction. Each LED head 16 has LED elements inside which are arranged in the leftward/rightward direction, and is configured to cause the LED elements to emit light according to a light emission pattern based on image data fed by controller 3. Image drum units 15 are located very close to LED heads 16 when mounted in printer chassis 2, and are subjected to exposure processing by the light from LED heads 16.

Further, image drum units 15C, 15M, 15Y, and 15K are respectively connected to toner cartridges 18C, 18M, 18Y, and 18K (hereinafter, these are referred to as toner cartridges 18 collectively) located above them. Toner cartridges 18 are each a hollow container long in the leftward/rightward direction which houses a powdery toner of the corresponding color and is incorporated with a predetermined stirring mechanism.

Incidentally, transfer rollers 13C, 13M, 13Y, and 13K (hereinafter, these are referred to as transfer rollers 13 collectively) are arranged in transfer belt unit 10 at four locations between front and rear rollers 11 and immediately below respective image drum units 15. To put it another way, an upper part of transfer belt 12 is nipped between image drum units 15 and the corresponding transfer rollers 13. Incidentally, each transfer roller 13 is designed to be capable of being charged.

Controller 3 causes toner to be fed from toner cartridges 18 to image drum units 15. Controller 3 also causes each LED head 16 to emit light such that the light forms a light emission pattern according to image data fed by a host apparatus (not illustrated). In response to this, image drum units 15 form toner images according to the light emission patterns of their corresponding LED heads by using the toner fed by toner cartridges 18, respectively, and transfer the toner images onto paper sheet P one by one (to be described in detail later). Thereby, the toner images of four colors according to the image data are sequentially transferred onto paper sheet P being transported by transfer belt unit 10.

Fixation unit 20 is disposed behind transfer belt unit 10, i.e., near the center in the upward/downward direction of printer chassis 2 and near the rear edge thereof. Fixation unit 20 includes heating roller 21 and pressure roller 22. Heating roller 21 has the shape of a cylinder having a central axis extending in the leftward/rightward direction, and has a heater inside. Pressure roller 22 has the shape of a cylinder similarly to heating roller 21, and presses its upper surface against the lower surface of heating roller 21 with a predetermined pressing force.

Fixation unit 20 is configured to heat heating roller 21 and rotate heating roller 21 and pressure roller 22 in their predetermined directions under the control of controller 3. Thereby, fixation unit 20 applies heat and pressure onto paper sheet P, which is transferred from transfer belt unit 10, i.e., on which the toner images of four colors are laid, so as to fix the toner to the sheet, and then transfers the sheet to a rear upper part of the printer.

Delivery unit 24 is disposed behind and above fixation unit 20. Delivery unit 24 is formed by a combination of rollers (not illustrated) each having a central axis extending in the leftward/rightward direction, a guide for guiding paper sheet P, and the like. Under the control of controller 3, delivery unit 24 rotates its rollers as needed to transport paper sheet P transferred from fixation unit 20 to the rear upper part of the printer, and then flip it over toward the front and discharge it to discharge tray 2T formed on the upper surface of printer chassis 2.

In this way, when executing a printing process, color printer 1 causes image drum units 15 of the respective colors to form toner images with light emitted by LED heads 16, respectively, and sequentially transfers the toner images onto paper sheet P.

[2. Configuration of the Image Drum Unit]

Figure 2:
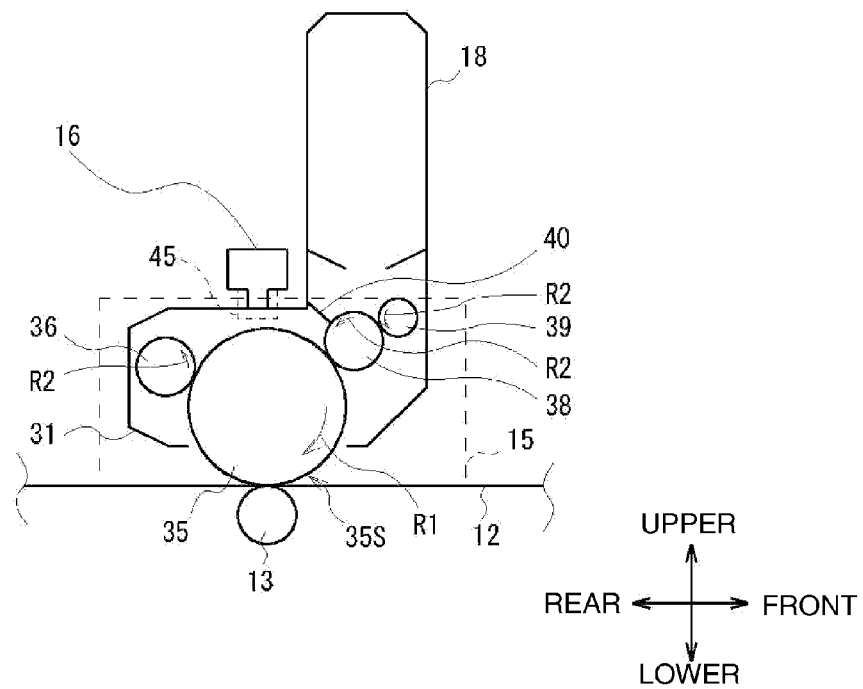
FIG. 2 is a schematic view illustrating the configuration of an image drum unit.

Next, the configuration of each image drum unit 15 is described. As illustrated in the schematic sectional view of FIG. 2, most of the outer periphery of image drum unit 15 is covered with frame 31, and image drum unit 15 has a relatively large space inside.

Photoconductive drum 35 which is an electrostatic latent image carrier is disposed inside image drum unit 15 at a lower center thereof. Photoconductive drum 35 has the shape of a cylinder with a central axis extending in the leftward/rightward direction, and is supported by frame 31 to be rotatable about its central axis. Incidentally, photoconductive drum 35 is rotated in a direction denoted by arrow R1 (R1 direction) by a driving force transmitted from a motor not illustrated.

A relatively large region of a part, corresponding to the lower surface of photoconductive drum 35, of frame 31 is left open. Thus, image drum unit 15 when mounted in printer chassis 2 (FIG. 1) can bring the lower surface of photoconductive drum 35 into contact with transfer belt 12 or paper sheet P placed on transfer belt 12. In addition, an exposure hole long in the leftward/rightward direction is bored in a part of frame 31 immediately above photoconductive drum 35.

Charging roller 36 is disposed behind and above photoconductive drum 35. Charging roller 36 has the shape of a cylinder having a diameter smaller than photoconductive drum 35. Charging roller 36 is made of a semiconductive elastic material, for example, and has a circumferential side surface in contact with circumferential side surface 35S of photoconductive drum 35. Charging roller 36 is thereby configured to evenly charge a location of contact of circumferential side surface 35S with this roller.

Development roller 38 is disposed ahead of and above photoconductive drum 35. Development roller 38 has the shape of a cylinder having a diameter smaller than photoconductive drum 35. Development roller 38 is made of semiconductive urethane rubber made by controlling, as needed, the electrical resistance of a urethane rubber material by adding thereto a conductive material such as carbon, for example, and is designed to be capable of being charged. The circumferential side surface of development roller 38 is in contact with circumferential side surface 35S of photoconductive drum 35 on the rear side of the development roller, and is in contact with feed roller 39 on the front side thereof. Feed roller 39 has the shape of a cylinder having a diameter slightly smaller than development roller 38, and is made of a semiconductive silicone foam sponge, for example.

Sheet-shaped development blade 40 is disposed ahead of and above development roller 38. Development blade 40 is made of metal such as stainless steel or phosphor bronze, or a rubber material such as silicone rubber. The rear upper edge of development blade 40 is fixed to the inside of frame 31, and a slight clearance is defined between the front lower edge of the blade and the circumferential side surface of development roller 38.

Further, spacers 45 are arranged above and at both left and right sides of photoconductive drum 35. The sizes of spacers 45, their attachment positions with respect to frame 31, and the like are so optimized that the distance between the circumferential side surface of photoconductive drum 35 and LED head 16 is set at a desired length by bringing the lower surface of LED head 16 into contact with the upper surfaces of the spacers (to be described in detail later).

For printing of an image on paper sheet P under the control of controller 3, image drum unit 15 having the above configuration rotates photoconductive drum 35 in the R1 direction, rotates charging roller 36, development roller 38, and feed roller 39 in a direction denoted by arrow R2 (R2 direction), and charges charging roller 36 and development roller 38. Incidentally, image drum unit 15 causes photoconductive drum 35, charging roller 36, and development roller 38 to rotate without sliding over each other.

First, a rear upper part of circumferential side surface 35S of photoconductive drum 35 is evenly charged by charging roller 36, and then with the rotation of the drum in the R1 direction, this charged part reaches the vicinity of the upper edge of the photoconductive drum and faces LED head 16. With this event, circumferential side surface 35S of photoconductive drum 35 is exposed to light emitted by LED head 16 in the light emission pattern based on image data, and thereby an electrostatic latent image according to the image data is formed on the drum.

On the other hand, by way of feed roller 39, toner fed from toner cartridge 18 is attached to the circumferential side surface of development roller 38 which is rotated in the R2 direction. Next, excess toner is shaved off the development roller by development blade 40, so that toner is attached to the circumferential surface of the roller uniformly in the form of a thin film.

Photoconductive drum 35 is further rotated in the R1 direction and, near the front edge of the drum where it comes into contact with development roller 38, the toner formed in the form of a thin film on the circumferential side surface of development roller 38 is attached only to the part of circumferential side surface 35S corresponding to the electrostatic latent image formed on the drum. In this manner, a toner image according to the image data is formed on circumferential side surface 35S of photoconductive drum 35. Incidentally, the toner image formed on circumferential side surface 35S at this time is an image representing only one color component (that is, any of cyan, magenta, yellow, and black) that this image drum unit 15 handles.

Then, photoconductive drum 35 is further rotated in the R1 direction, and thus the toner image reaches the vicinity of the lower edge of the drum. In this event, controller 3 causes transfer belt unit 10 (FIG. 1) to transport paper sheet P to under image drum unit 15, and charges transfer roller 13 with the polarity opposite to that of the toner. Accordingly, image drum unit 15 nips paper sheet P between charged transfer roller 13 and a part of photoconductive drum 35 where the toner image is formed, and transfers this toner image onto paper sheet P. Incidentally, if toner is left on circumferential side surface 35S of photoconductive drum 35 after the toner image is transferred on paper sheet P, such toner is removed by a cleaning device not illustrated.

In this way, image drum unit 15 can form a toner image on circumferential side surface 35S of photoconductive drum. 35 using the exposure function of LED head 16 while causing LED head 16 to face the vicinity of the drum.

3. Configuration of the LED Head

Figure 3:
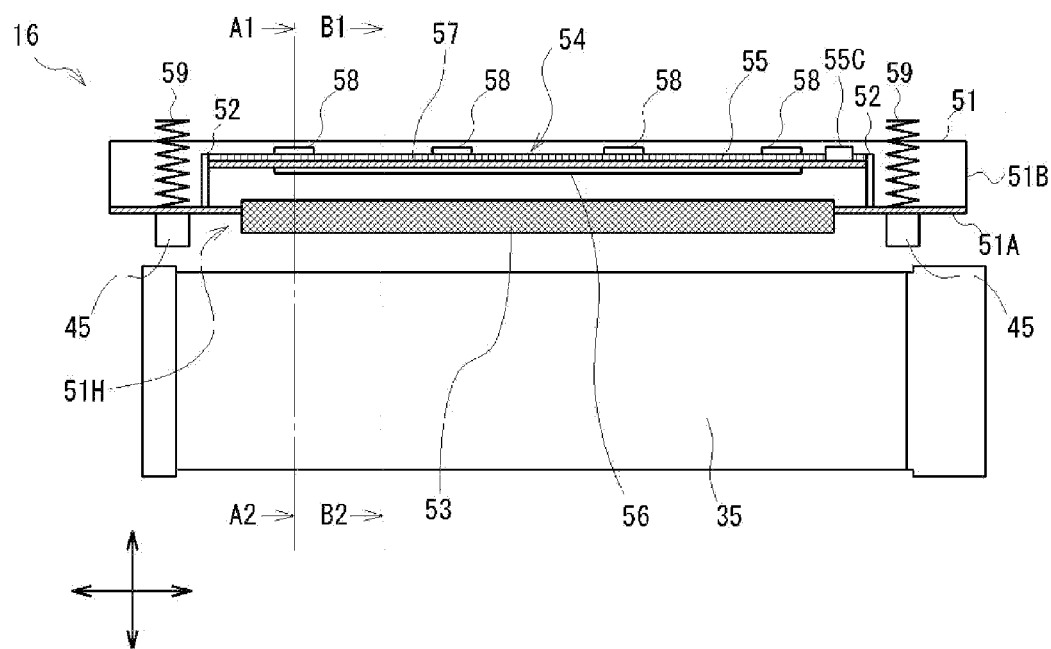
FIG. 3 is a schematic view illustrating the configuration of an LED head.
Figure 4:
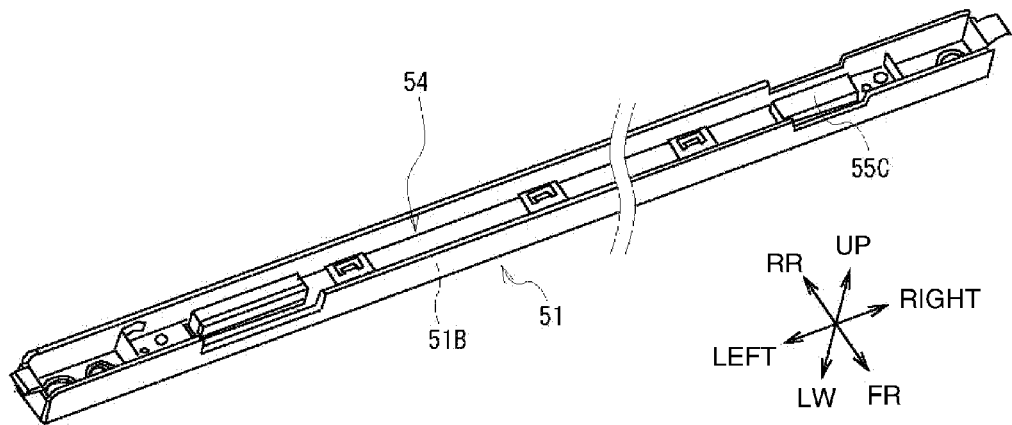
FIG. 4 is a schematic perspective view illustrating the configuration of the LED head.
Figure 5:
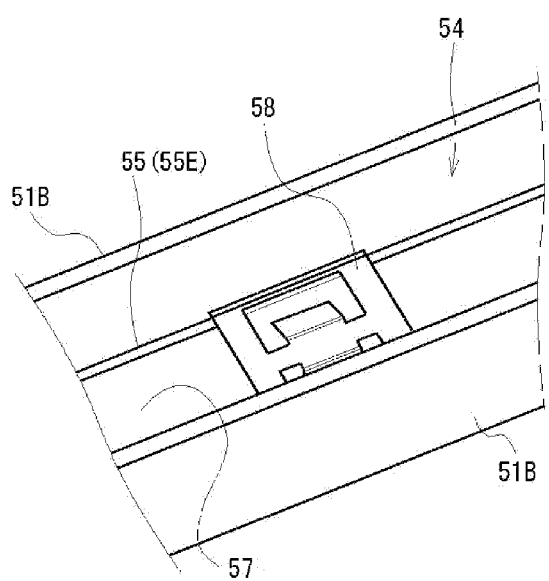
FIG. 5 is another schematic perspective view illustrating the configuration of the LED head.
Figure 6A:
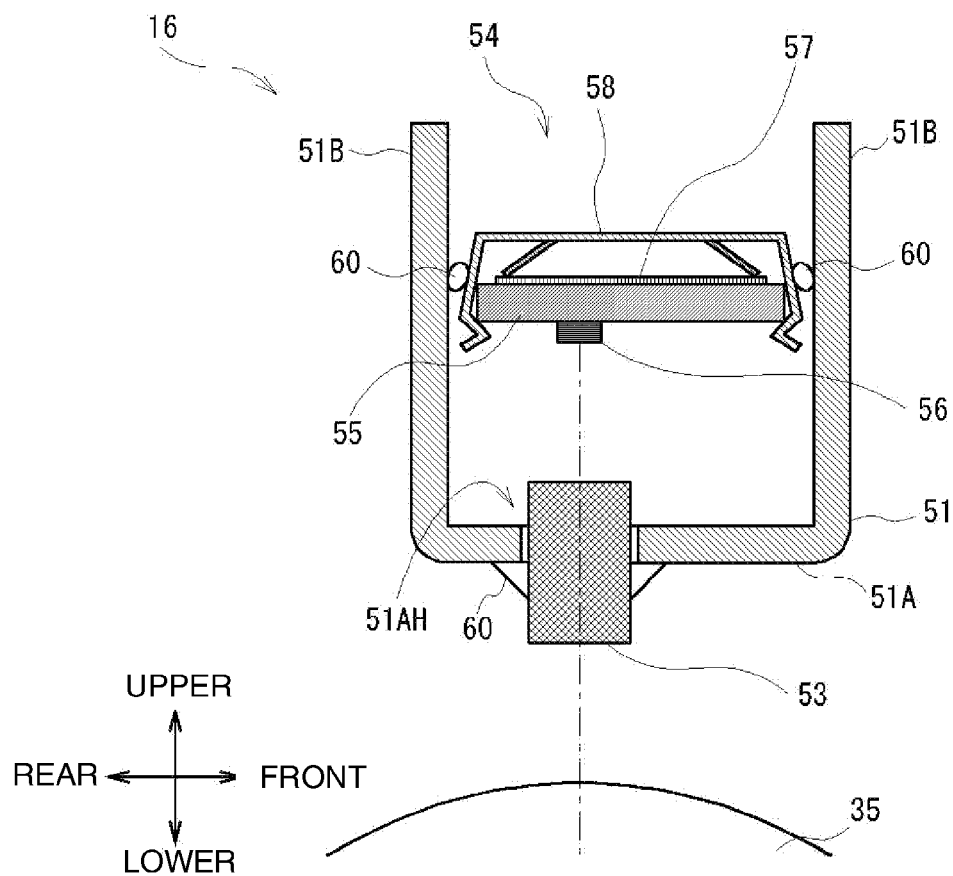
FIGS. 6A and 6B are schematic sectional views illustrating the configuration of the LED head.
Figure 6B:
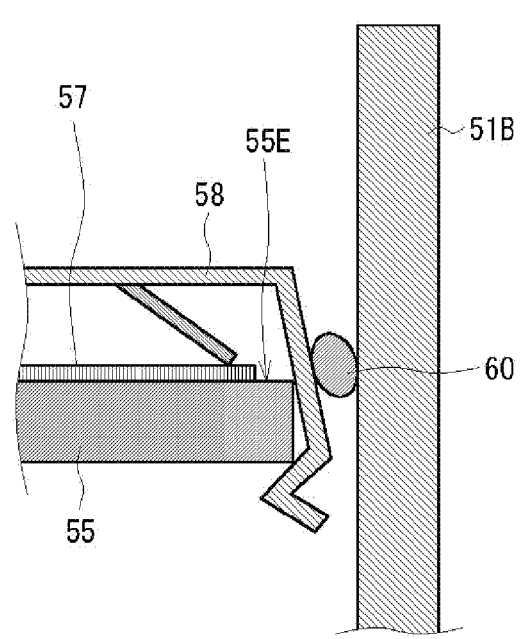
Figure 7A:
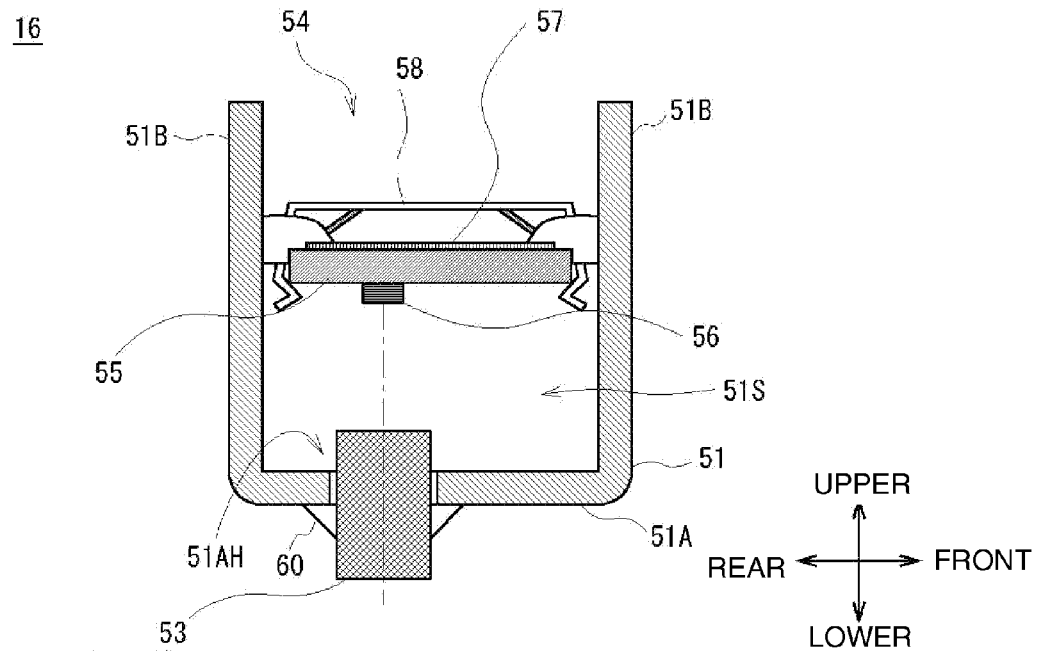
FIGS. 7A and 7B are other schematic sectional views illustrating the configuration of the LED head.
Figure 7B:
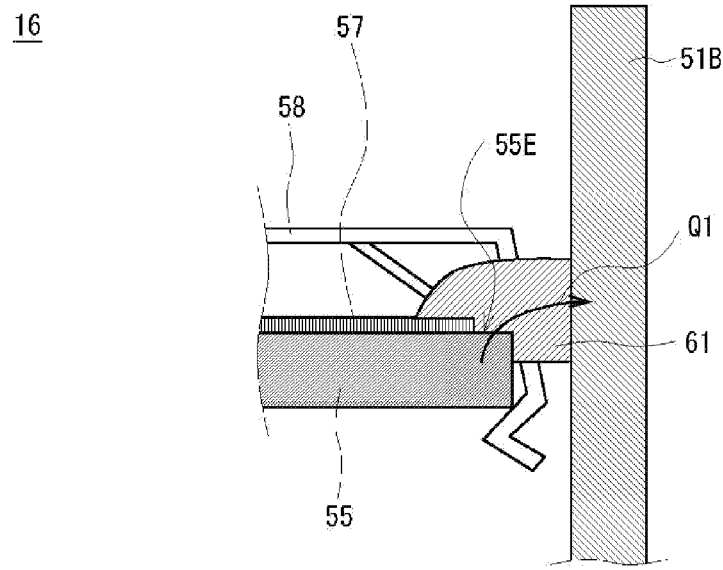

Next, the configuration of LED head 16 is described. As illustrated in FIGS. 3, 4, 5, 6, and 7, LED head 16, which is an exposure device, as a whole has the shape of a rectangular solid long in the leftward/rightward direction, and has a configuration where various components are attached to holder 51 which is a holder or a support member. Incidentally, FIG. 3 is a sectional view illustrating LED head 16 as well as photoconductive drum 35 as viewed from the front side. FIG. 4 is a perspective view illustrating LED head 16 as viewed from the obliquely-left front upper side. FIG. 5 is an enlarged perspective view illustrating a part of FIG. 4 on an enlarged scale. FIG. 6A is a sectional view taken along line A1-A2 of FIG. 3 and FIG. 6B is a partial enlarged view of FIG. 6A. FIG. 7A is a sectional view taken along line B1-B2 of FIG. 3 and FIG. 7B is a partial enlarged view of FIG. 7A.

Holder 51 has, as its central part, basal part 51A in the form of a plate long in the leftward/rightward direction and thin in the upward/downward direction. Side parts 51B in the form of a plate long in the leftward/rightward direction and thin in the forward/rearward direction extend upward from both front and rear sides of basal part 51A. Hole part 51AH in the form of a slit long in the leftward/rightward direction is bored at substantially the center of basal part 51A in the forward/rearward direction such that it penetrates basal part 51A in the upward/downward direction. Side parts 51B each have the shape of a substantially flat plate without any steps or the like. In addition, light shield plates 52 stand upward on the upper surface of basal part 51A and at both left and right sides of hole part 51AH Incidentally, holder 51 is manufactured by subjecting a steel sheet in the form of a flat plate to a cutting process, bending process, and the like, and its manufacturing cost is relatively low.

Rod lens array 53 which is a condenser lens array is mounted in hole part 51AH. Rod lens array 53 as a whole has them shape of a rectangular solid long in the leftward/rightward direction, and has multiple minute lenses arrayed in the leftward/rightward direction. These lenses have such an optical characteristic as to converge light emitted from LED array chip 56 to be described later.

In addition, LED substrate unit 54 is mounted in holder 51 above rod lens array 53 such that it is sandwiched between front and rear side parts 51B. LED substrate unit 54 includes substrate 55, LED array chip 56, protective sheet 57, and attachments 58.

Substrate 55 is made of a so-called glass epoxy substrate and has the shape of a plate long in the leftward/rightward direction and thin in the upward/downward direction. Substrate 55 has such a configuration that wiring layers each having a predetermined wiring pattern formed thereon are stacked in the upward/downward direction. The length in the forward/rearward direction of substrate 55 is shorter than the distance between side parts 51B of holder 51, and the length in the leftward/rightward direction thereof is shorter than the distance between light shield plates 52 of holder 51.

Incidentally, a part of the wiring pattern is exposed on each of the upper and lower surfaces of substrate 55, and through holes for connecting the wiring patterns of the layers to each other in a vertical direction are provided at appropriate locations in substrate 55. Moreover, connector 55C for connecting a wiring member is attached to a predetermined position on the upper surface of substrate 55.

LED array chip 56 which is a light-emitting element array is attached to the lower surface of substrate 55. In LED array chip 56, light-emitting points at which the elements emit light downward are arrayed in the leftward/rightward direction at predetermined minute intervals. LED array chip 56 is physically fixed, through die bonding for example, and electrically connected to the wiring pattern formed on the lower surface of substrate 55.

Protective sheet 57 is made of an insulating material. Protective sheet 57 has the shape of a film which is thin in the upward/downward direction and long in the leftward/rightward direction, and which has a length in the forward/rearward direction (i.e., width) narrower than substrate 55. In addition, holes, notches, and the like are formed in protective sheet 57 as needed so that connector 55C and the like may be exposed on the sheet without being covered therewith. Protective sheet 57 is laid over the upper surface of substrate 55, namely, over the surface opposite to the lower surface on which LED array chip 56 is mounted, in such a way that both front and rear edges of protective sheet 57 are respectively spaced from both front and rear edges of substrate 55 in the forward/rearward direction.

Attachments 58 which are attachment members are each formed by subjecting a thin steel sheet as thin as about 0.1 to 0.3 [mm] to a cutting process and a bending process, for example. Attachment 58 is conductive due to the nature of a steel sheet, and can exert elastic force upon the application of an external force such as a bending force. With such an elastic force, attachment 58 can attach protective sheet 57 to substrate 55 while pinching the sheet between the attachment and the substrate, as illustrated in FIGS. 6 and 7. Incidentally, because attachment 58 is made of a steel sheet, it can stably keep its shape and elastic force even under a high temperature environment, unlike a resin material or the like.

Further, coil springs 59 are attached to the upper surface of basal part 51A to stand upward near both left and right edges of holder 51. When compressed in the upward/downward direction, coil springs 59 exert an elastic force to try to extend in the upward/downward direction. When coil springs 59 at their upper ends are fixed to the printer chassis (FIG. 1) side while being compressed in the upward/downward direction, they press the lower surface of basal part 51A of holder 51 against spacers 45 (FIG. 3) on the image drum unit 15 side. Thereby, coil springs 59 can adjust the distance between the circumferential side surface of photoconductive drum 35 and the lower edge of rod lens array 53 to a desired distance and keep this desired distance.

In this way, LED substrate unit 54 of LED head 16 is fixed to holder 51 in the state where protective sheet 57 is laid over the upper surface of substrate 55 at an appropriate position and attachments 58 are attached thereto.

[4. Process of Manufacturing the LED Head]

Next, a process of manufacturing LED head 16 is described mainly in terms of a process of manufacturing LED substrate unit 54 and a process of mounting LED substrate unit 54 in holder 51.

In a process of assembling LED substrate unit 54, firstly, LED array chip 56 is attached to the lower surface of substrate 55, and then protective sheet 57 is laid over the upper surface of substrate 55. In this event, the position of protective sheet 57 with respect to substrate 55 is appropriately set by using a jig (not illustrated). Thereby, as illustrated in FIGS. 4, 5, 6, and the like, both front and rear edges of protective sheet 57 are positioned inward of both front and rear edges of substrate 55 so that exposed parts 55E, being front and rear circumferential portions of substrate 55 on its upper surface, may be exposed.

Subsequently, in LED substrate unit 54 in a part above substrate 55 where protective sheet 57 is laid over the substrate, attachment 58 is elastically deformed by application of external force to widen the distance between the two edges of attachment 58 in the forward/rearward direction. While its deformed shape is kept, attachment 58 is moved downward and then released from the external force. Thereby, while securing the insulation properties of the upper surface of substrate 55 and protecting the upper surface thereof against physical damage by use of protective sheet 57, LED substrate unit 54 can fix the position of protective sheet 57 by use of attachment 58.

Incidentally, as illustrated in FIGS. 3 and 4, multiple attachments 58 are mounted in LED substrate unit 54 such that they are arranged at almost predetermined intervals in the leftward/rightward direction, i.e., in the direction in which the light-emitting points of LED array chip 56 are arrayed.

Figure 8:
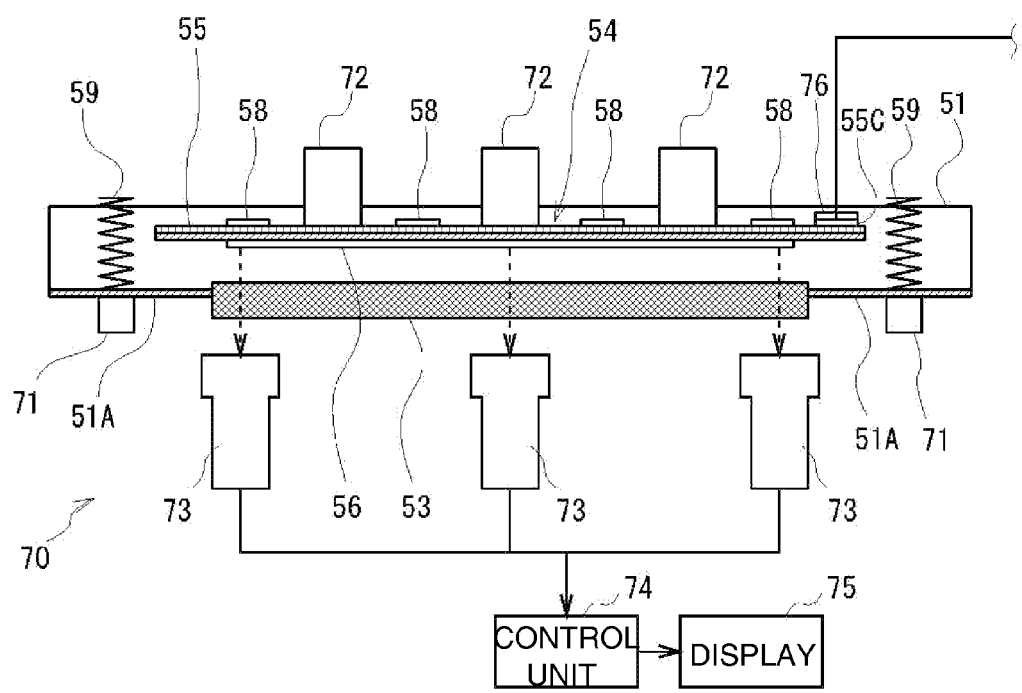
FIG. 8 is a schematic view illustrating the configuration of a manufacturing jig.

Next, in LED head 16, LED substrate unit 54 is mounted in holder 51 by using manufacturing jig 70 illustrated in FIG. 8. Manufacturing jig 70 includes: spacers 71 arranged one by one at the lower side of the head and near both left and right edges thereof; chucks 72 arranged at the upper side of the head; photosensors 73 arranged at the lower side of the head; controller 74; display 75; and jig connector 76.

Spacers 71 correspond to spacers 45 (FIG. 3) of image drum unit 15. The position of LED head 16 in manufacturing jig 70 is set by bringing the lower surface of basal part 51A of holder 51 into contact with the upper surfaces of spacers 71. Chucks 72 have a suction function, and are capable of sucking up the upper surface of LED substrate unit 54 and holding the substrate part. In addition, chucks 72 are configured to be capable of moving in the upward/downward direction or in the leftward/rightward direction, adjusting their angles, and the like while holding LED substrate unit 54.

Photosensors 73 are equivalent to photosensitive drum 35. Photosensors 73 each have photosensing elements for receiving light on its upper surface, and the distance between the upper surfaces of spacers 71 and the upper surface of photosensor 73 is adjusted appropriately. Photosensor 73 is configured to receive light incident thereon from the above, generate a light reception signal according to the amount of received light, and send it to controller 74. Controller 74 is configured to form a predetermined display screen by using figures, graphs, and the like based on the received light reception signal, and display it on display 75 to notify an operator and the like of the amount of receiving light.

Jig connector 76 is attached to the leading end of a wiring member electrically connected to controller 74, and includes terminals (not illustrated), and is formed in such a shape as to be able to be engaged with connector 55C of substrate 55. Jig connector 76 can supply LED array chip 56 of LED substrate unit 54 with electrical signals for causing the LED elements to emit light by connecting jig connector 76 to connector 55C of substrate 55 and bringing their terminals into continuity with each other.

For manufacturing LED head 16, firstly, rod lens array 53 and two coil springs 59 are attached to holder 51. Incidentally, a sufficient amount of adhesive 60 is used to bond rod lens array 53 to holder 51 so as to close the gap between holder 51 and rod lens array 53, or predetermined filler is filled between the gap therebetween.

Next, holder 51 is mounted to manufacturing jig 70 in the state where coil springs 59 are compressed in the upward/downward direction. Here, coil springs 59 exert an elastic force while their upper ends are in contact with predetermined positions of manufacturing jig 70. Coil springs 59 thereby apply a downward force on holder 51 to press the lower surface of basal part 51A against the upper surfaces of spacers 71 and bring them into contact with each other without any gap between them. Since the distance between the upper surfaces of spacers 71 and the upper surfaces of photosensors 73 is set appropriately, manufacturing jig 70 can fix holder 51 at an appropriate position temporarily.

Next, manufacturing jig 70 adsorbs LED substrate unit 54 in the state where chucks 72 are moved above holder 51. In addition, jig connector 76 of manufacturing jig 70 is connected to connector 55C of substrate 55 in LED substrate unit 54.

In the above state, by manipulation by an operator, manufacturing jig 70 moves chucks 72 downward to roughly align the position of LED substrate unit 54 with an ideal mounting position in holder 51 first. Then, manufacturing jig 70 supplies a predetermined signal to LED array chip 56 of LED substrate unit 54 through jig connector 76 so as to cause the elements of LED array chip 56 to emit light. The light outputted from LED array chip 56 as diverging rays at this time is converged by rod lens array 53 and irradiated on the upper surfaces of photosensors 73.

Manufacturing jig 70 lets an operator and the like visually check through display 75 the amount of light received by photosensors 73. At this time, with reference to the amount of receiving light, the operator finely adjusts the positions and angles of chucks 72 holding LED substrate unit 54 so that the position of LED substrate unit 54 may be adjusted to an optimal position, that is, a position where the sensors can receive a desired amount of light. Thereby, LED substrate unit 54 can cause the optical axis of LED array chip 56 to be directed in parallel with the central axis of rod lens array 53, and can set the distance between the lower edge of LED array chip 56 and the upper edge of rod lens array 53 at an ideal distance throughout a main-scanning direction (i.e., the leftward/rightward direction).

In the above state, LED substrate unit 54 is fixed to the ideal position with respect to holder 51 by filling adhesive 60 (FIG. 6) in front and rear side portions of each attachment 58 and between front and rear side parts 51B of holder 51. Adhesive 60 is, for example, an ultraviolet cure adhesive designed to be cured in a relatively short period of time when applied to a location to be bonded in the form of liquid or gel and then irradiated with ultraviolet light.

Next, in LED head 16, sealant 61 made of silicone is filled in gaps between LED substrate unit 54 and front and rear side parts 51B of holder 51 so as to fill in these gaps (FIGS. 7A and 7B). Thereby, LED head 16 can substantially seal space 51S which is surrounded by basal part 51A and front rear side parts 51B of holder 51 and the lower surface of substrate 55.

At this time, sealant 61 is filled to come into contact with both side parts 51B of holder 51 and parts of the upper surface of substrate 55 that are exposed without being covered with protective sheet 57, namely, parts around the front and rear edges of substrate 55 (these are referred to as exposed parts 55E in this disclosure).

Due to the nature of silicone, sealant 61 is made relatively soft and has a thermal conductivity higher than the material for protective sheet 57. Thus, once filled, sealant 61 is deformed flexibly to substantially seal the gaps between substrate 55 and holder 51 and come into contact with a relatively large area of each of exposed parts 55E and side parts 51B.

Thereby, as illustrated by arrow Q1 in FIG. 7B, sealant 61 can effectively transmit the heat of substrate 55 to holder 51. Moreover, because sealant 61 is flexible but as rigid and strong as gel, it can keep well its shape at the time of being filled without flowing off like a liquid.

Incidentally, LED head 16 is designed to prevent an incident of external light coming in from the leftward/rightward direction, the entrance of foreign matter, and the like by using left and right light shield plates 52 of holder 51 (FIG. 3).

In this way, in LED head 16, exposed parts 55E not covered with protective sheet 57 are defined in the upper surface of substrate 55. Then, in the process of mounting LED substrate unit 54, sealant 61 seals the gaps between substrate 55 and side parts 51B of holder 51, and is widely brought into contact with exposed parts 55E and side parts 51B.

Incidentally, in LED head 16, if LED substrate unit 54 should be displaced from its ideal position with respect to holder 51 after manufacturing, sealant 61 is removed and attachments 58 of a relatively low cost are cut off and broken with a nipper or the like. Thereby, according to LED head 16, it is possible to take out substrate 55 and LED array chip 56 of relatively high cost from holder 51 without damaging these, and reuse and mount these to new holder 51 or reused holder 51.

[5. Operation and Effect]

In the manufacturing of LED head 16 of color printer 1 according to this embodiment with the above configuration, LED substrate unit 54 is formed by laying protective sheet 57 over the upper surface of substrate 55, on which LED array chip 56 is mounted, so that exposed parts 55E (FIGS. 5, 6, and 7) may be defined therein, and attaching attachments 58.

Next, in LED head 16, the position of LED substrate unit 54 is adjusted with respect to holder 51, in which rod lens array 53 is mounted, by use of manufacturing jig 70. In this adjusted state, attachments 58 are fixedly attached with adhesive 60, and the gaps between substrate 55 and holder 51 are sealed with sealant 61.

Thus, according to LED head 16, it is possible to position LED substrate unit 54 so that photosensors 73 can receive an optimal amount of light emitted from LED array chip 56 and converged by rod lens array 53. Accordingly, when installed in printer chassis 2, LED head 16 can irradiate circumferential side surface 35S of photoconductive drum 35 (FIG. 2) with an optimal amount of light outputted from LED array chip 56 and appropriately converged through rod lens array 53.

In addition, at this time, LED substrate unit 54 can prevent electrical contact (i.e., electrical continuity) between attachments 58 and the upper surface of substrate 55 with protective sheet 57, and prevent minute foreign matter such as toner from entering space 51S through the through-holes formed in substrate 55.

Further, because sealant 61 to seal the gaps between substrate 55 and holder 51 is in contact with a large area of each of exposed parts 55E on the upper surface of substrate 55 and side parts 51B of holder 51, LED head 16 can effectively transmit heat between substrate 55 and holder 51.

Thereby, LED head 16 can transmit heat generated by the emission of light by LED array chip 56 to substrate 55, then smoothly transmit the heat from exposed parts 55E of substrate 55 to side parts 51B of holder 51 via sealant 61, and then diffuse the heat from the outer circumferential surface of holder 51 toward a surrounding space. In other words, LED head 16 can transmit heat generated by the emission of light by LED array chip 56 to holder 51 effectively without confining the heat inside substrate 55 or space 51S (FIG. 7), and thus can prevent deterioration in the performance (such as light-emission efficiency) of LED array chip 56, reduction in the life of the chip, damage on the chip, and the like due to the heat.

Further, LED head 16 can increase transmission efficiency of heat from substrate 55 to holder 51 while using sealant 61 made of silicone as in the conventional case, only by putting a twist on the shape of protective sheet 57 so that exposed parts 55E may be defined in the upper surface of substrate 55. In other words, it is possible to manufacture LED head 16 at the same cost as a conventional LED head because there is no need to add a member for transmitting heat from substrate 55 to holder 51 to an LED head with a conventional configuration, nor use a sealant and the like of a nature different from that of a conventional LED head.

To put it another way, sealant 61 made of silicone having moderate flexibility and insulation properties is conventionally used for the purpose of filling the gaps between substrate 55 and holder 51 originally, that is, while no attention is paid to its thermal conductivity. Against such a background, while paying attention to the fact that silicone has good thermal conductivity, the embodiment forms exposed parts 55E in substrate 55 and uses sealant 61 also as a thermal conductor in LED head 16. The embodiment can thereby improve the heat dissipation property drastically while keeping the cost the same as before.

Further, even if through-holes should be formed in exposed parts 55E of substrate 55, LED head 16 can prevent foreign matter from dropping in space 51S through the through-holes thanks to sealant 61 covering the upper surfaces of these parts. Furthermore, owing to its moderate rigidity, sealant 61 can keep covering the gaps between substrate 55 and holder 51 and exposed parts 55E without flowing off to space 51S through the through-holes.

According to the configuration described so far, in LED head 16 of color printer 1, LED substrate unit 54 is formed by laying protective sheet 57 over the upper surface of substrate 55, on which LED array chip 56 is mounted, so that exposed parts 55E may be defined therein, and attaching attachments 58. Then, in the state where the position of LED array chip 56 is adjusted with respect to rod lens array 53 of holder 51, LED substrate unit 54 is bonded to side parts 51B of holder 51 with adhesive 60. Then, the gaps between substrate 55 and holder 51 are sealed with sealant 61. Thereby, LED head 16 can improve thermal conductivity between exposed parts 55E and side parts 51B, and transmit and dissipate heat, generated in LED array chip 56 and transmitted to substrate 55, via exposed parts 55E and sealant 61.

[6. Other Embodiments]

Figure 9A:
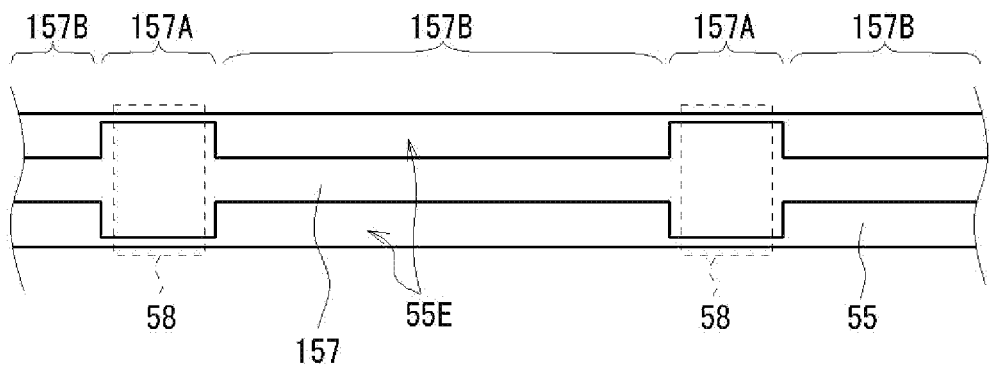
FIGS. 9A and 9B are schematic views illustrating the configuration of a protection sheet according to other embodiments.

Note that what is described in the above embodiment is a case where protective sheet 57 is rectangular in shape. However, the invention is not limited thereto. For example, the width in the forward/rearward direction of protective sheet 57 may be enlarged only at locations where attachments 58 are mounted and reduced at parts other than these locations, as illustrated in FIG. 9A. Thereby, it is possible to prevent unnecessary continuity or short circuiting of substrate 55 due to attachments 58, and increase the area of exposed parts 55E to further improve thermal conductivity between substrate 55 and sealant 61.

Figure 9B:
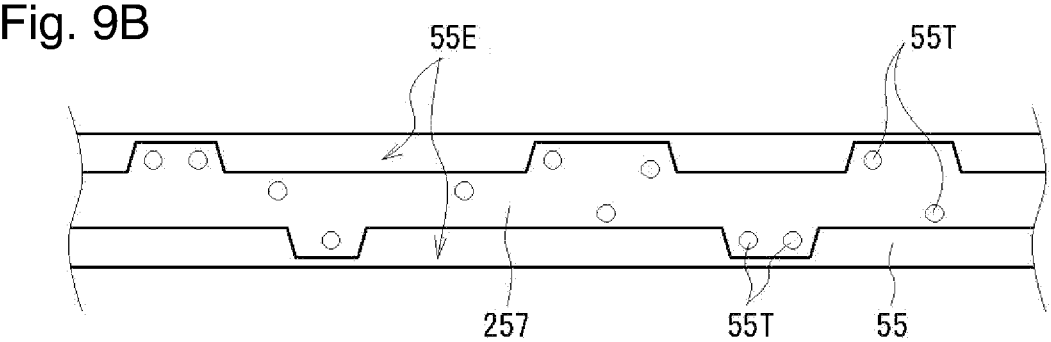

Alternatively, for example, protective sheet 57 may have such a shape as to match locations where through-holes 55T are formed on the upper surface of substrate 55, that is, such a shape as to positively cover through-holes 55T and positively expose other parts, as illustrated in FIG. 9B. In this case, even if there should be an error in the filling of sealant 61, it is possible to avoid such a risk that foreign matter drops in space 51S through exposed through-holes 55T.

Further, what is described in the above embodiment is a case where attachments 58 are made of a thin steel sheet which is conductive. However, the invention is not limited thereto. For example, attachments 58 may be made of a non-conductive material such as a resin material. In this case, protective sheet 57 can prevent substrate 55 from being damaged by the contact of attachments 58.

Further, what is described in the above embodiment is a case where sealant 61 is conductive. However, the invention is not limited thereto. For example, if an insulating material is applied on the upper surface of substrate 55, sealant 61 may be made of a non-insulating material. In this case, protective sheet 57 may also be made of a non-insulating material as long as it is capable of physically protecting the upper surface of substrate 55. In sum, any sealant 61 can do as long as it never interferes with the electrical operation of substrate 55 and it can conduct heat from exposure parts 55E of substrate 55 to side parts 51B of holder 51 highly efficiently.

Further, what is described in the above embodiment is a case where attachments 58 are bonded to side parts 51B of holder 51 when LED substrate unit 54 is mounted in holder 51. However, the invention is not limited thereto. For example, substrate 55 may be directly bonded to side parts 51B of holder 51. Alternatively, LED substrate unit 54 may be mounted in holder 51 by engaging side parts 51B with an engaging body of a predetermined shape formed in each attachment 58.

Further, what is described in the above embodiment is a case where the invention is applied to LED heads 16 of the respective color for image drum units 15 of the respective color which are arranged in series in the forward/rearward direction in tandem type color printer 1. However, the invention is not limited thereto. For example, the invention may be applied to LED heads mounted in other type color printers such as a four-cycle type color printer.

Further, what is described in the above embodiment is a case where four LED heads 16 corresponding to the colors of yellow, magenta, cyan, and black are mounted in printer chassis 2 of color printer 1 for color printing. However, the invention is not limited thereto. For example, three or less LED heads 16 or five or more LED heads 16 may be mounted in printer chassis 2 according to the number of colors of toner to be used in a color printer. Alternatively, one LED head 16 may be mounted in a monochrome printer for monochrome printing.

Further, in the above embodiment, the invention is applied to color printer 1 as an image formation apparatus. However, while not limited thereto, the invention is applicable to apparatuses such as a facsimile machine, a multi function product (MFP), and a copier as long as they have LED head 16 as an exposure device as in the case of color printer 1.

Further, the invention is not limited to the embodiment and other embodiments described above. In other words, the invention is applicable to an embodiment in which a part of, or all of, the embodiment and other embodiments described above are used in combination, or an embodiment in which a part of these embodiments is extracted.

Further, what is described in the above embodiment is a case where color printer 1 as an image formation apparatus includes LED head 16 as an exposure device including substrate 55 as a substrate, protective sheet 57 as a protective sheet, attachment 58 as an attachment member, holder 51 as a holder, and sealant 61 as a sealant. However, the invention is not limited thereto. An image formation apparatus may include an exposure device including a substrate, a protective sheet, an attachment member, a holder, and a sealant of other various configurations.

The invention is usable in a wide range of apparatuses including color printers and copiers which use light from one or more LEDs for exposure.

The invention claimed is:

1. An exposure device comprising:
    a substrate having a wiring pattern of a wiring member therein and having a first surface and a second surface opposed to the first surface, wherein a light-emitting element array for emitting exposure light is mounted on the first surface;
    a protective sheet covering the second surface while leaving at least a part of the second surface exposed in the vicinity of an edge of the substrate to define an exposed part of the second surface;
    an attachment member attached to the substrate and pressing the protective sheet to the second surface to thereby fix the protective sheet to the second surface;
    a holder that supports a condenser lens array for condensing light, and that supports the attachment member to support the substrate via the attachment member, with a gap formed between the holder and the exposed part of the substrate, to position the substrate such that light emitted from the light-emitting element array is condensed on a predetermined irradiation location through the condenser lens array; and
    a thermally-conductive sealant that covers the exposed part of the second surface of the substrate and seals the gap such that the thermally-conductive sealant is in direct contact with both the exposed part and the holder.

2. The exposure device according to claim 1, wherein the substrate exposes a part of the wiring member on the second surface,
    the attachment member is conductive, and
    the protective sheet is insulative.

3. The exposure device according to claim 2, wherein
the substrate exposes a part of the wiring member on the exposed part of the second surface, and
the sealant is insulative.

4. The exposure device according to claim 1, wherein
the protective sheet is shaped to define the exposed part of the second surface of the substrate such that a width of the exposed part from the edge of the substrate is greater at a portion away from a location of contact of the protective sheet with the attachment member than at a portion near the location of the contact.

5. The exposure device according to claim 1, wherein
the substrate is provided with a through-hole, and
the protective sheet is insulative and formed in such a shape as to cover the through-hole.

6. The exposure device according to claim 1, wherein
the substrate is provided with through-holes, and
the sealant is insulative and covers a through-hole formed in the exposure part of the second surface of the substrate.

7. An image formation apparatus comprising the exposure device according to claim 1.

8. The exposure device according to claim 1, wherein
the exposed part is provided at each widthwise side of a protection area of the second surface which is covered with the protective sheet,
the thermally-conductive sealant is provided to cover the exposed part at the each widthwise side of the protection area.

9. The exposure device according to claim 1, further comprising
a glue provided in the gap between the substrate and the holder and fixing the attachment to the holder, thereby fixing the substrate to the holder via the attachment, wherein
the thermally-conductive sealant seals an area of the gap where the glue have not sealed the gap.

10. A method of manufacturing an exposure device having a substrate having a first surface and a second surface opposed to the first surface, wherein a light-emitting element array for emitting exposure light is mounted on the first surface, the method comprising:
covering the second surface with a protective sheet such except for a part of the second surface in the vicinity of an edge of the substrate, which is defined as an exposed part of the second surface;
attaching an attachment member to the substrate such that the attachment member presses and fixes the protective sheet to the second surface of the substrate;
fixing the attachment member to a holder having a condenser lens array supported, with a gap formed between the holder and the exposed part of the second surface of the substrate, while positioning the substrate such that light emitted from the light-emitting element array is condensed on a predetermined irradiation location through the condenser lens array; and
providing a thermally-conductive sealant such that the sealant covers the exposed part of the second surface of the substrate and seals the gap and thereby the thermally-conductive sealant is in direct contact with both the exposed part and the holder.

* * * * *